United States Patent

Day

[11] Patent Number: 5,468,188
[45] Date of Patent: Nov. 21, 1995

[54] UNIVERSAL COUPLING

[76] Inventor: Stanley J. Day, 21 Dellwood Cove, St. Paul, Minn. 55128

[21] Appl. No.: 955,680

[22] Filed: Oct. 2, 1992

[51] Int. Cl.$^6$ ..................................................... F16D 3/52
[52] U.S. Cl. .............................. 464/60; 464/57; 464/903; 267/148
[58] Field of Search .......................... 464/54–60, 903, 464/106, 118, 116, 78; 403/122, 128, 131; 267/148, 141

[56] References Cited

U.S. PATENT DOCUMENTS

| | | | |
|---|---|---|---|
| 664,784 | 12/1900 | Snell | 403/122 X |
| 1,485,036 | 2/1924 | Kinsley | 464/57 |
| 1,623,582 | 4/1927 | Eckart | 464/57 X |
| 2,917,910 | 12/1959 | Herbenar | 464/60 |
| 2,964,928 | 12/1960 | Marquis | 464/116 |
| 2,991,637 | 7/1961 | Lochow | 464/57 |
| 3,000,198 | 9/1961 | Stout | 464/57 |
| 3,430,457 | 3/1969 | Gee | 464/60 X |
| 3,792,597 | 2/1974 | Orain | 464/118 |
| 4,629,352 | 12/1986 | Nemoto | 403/128 |
| 4,765,602 | 8/1988 | Roeseler | 267/148 |
| 4,786,033 | 11/1988 | Kofler | 267/148 X |
| 4,894,108 | 1/1990 | Richard et al. | 267/148 X |
| 4,934,990 | 6/1990 | Backers | 464/57 X |

Primary Examiner—John J. Calvert
Attorney, Agent, or Firm—Friederichs Law Firm

[57] ABSTRACT

A joint for connecting a first drive shaft to a second drive shaft includes a ball and socket arrangement connecting the two shafts and a spring attached at one end to one shaft and at the other end to the other shaft. The spring is made of a polymer matrix containing fibers made from poly(p-phenylene terephthalamide) resin. The fibers extend through the polymer matrix along the helical axis of the spring. The spring is disposed about the ball and socket arrangement so that shock loads are absorbed by the spring.

20 Claims, 4 Drawing Sheets

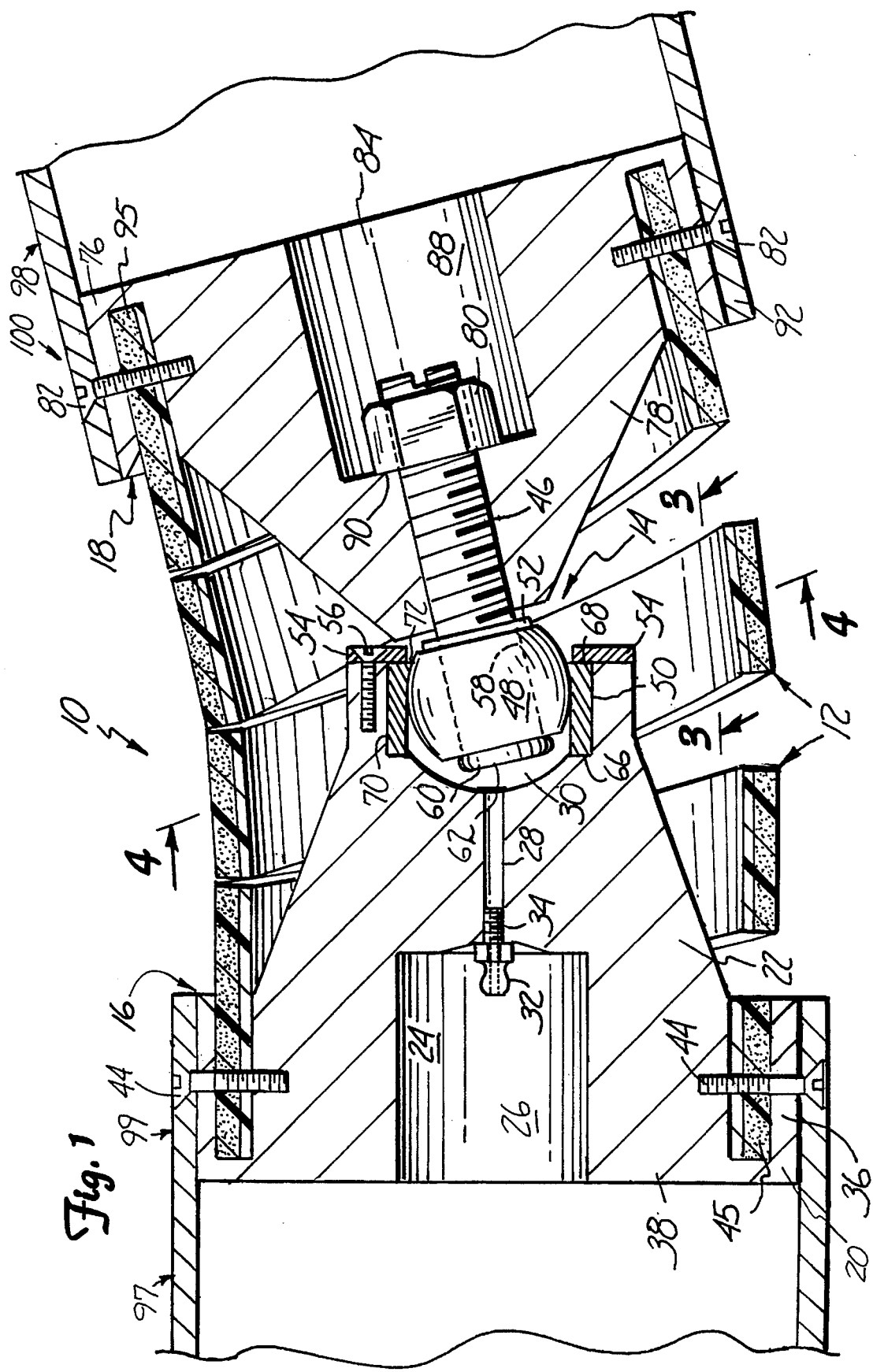

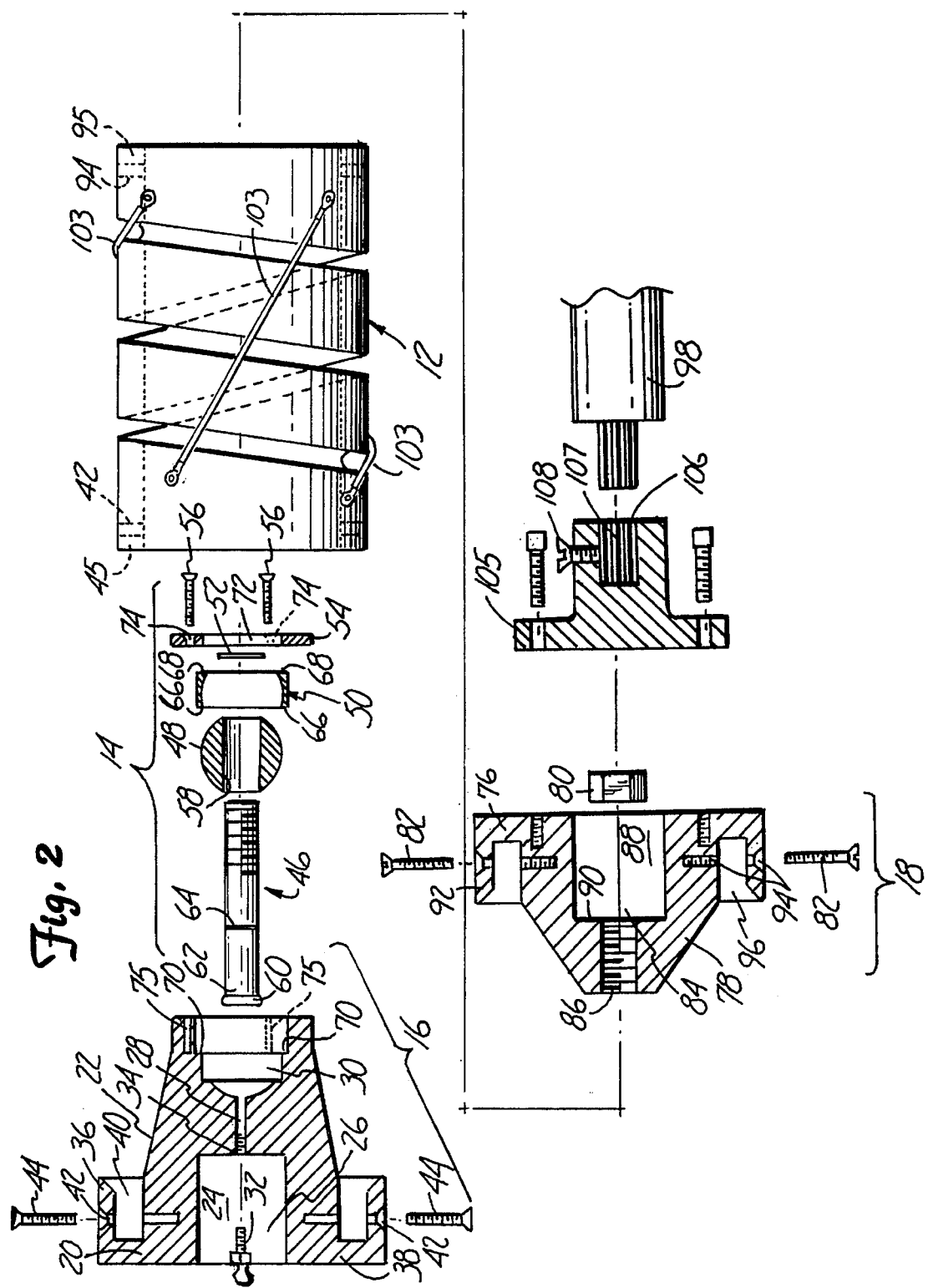

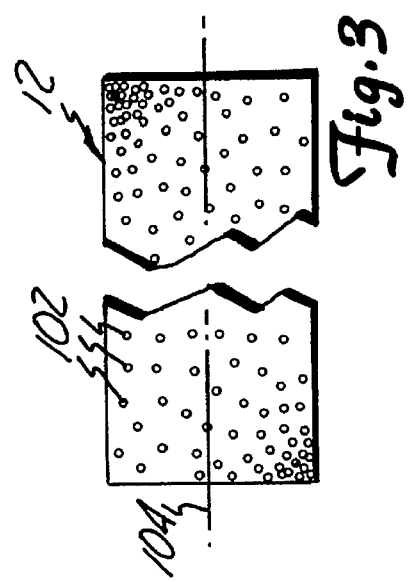
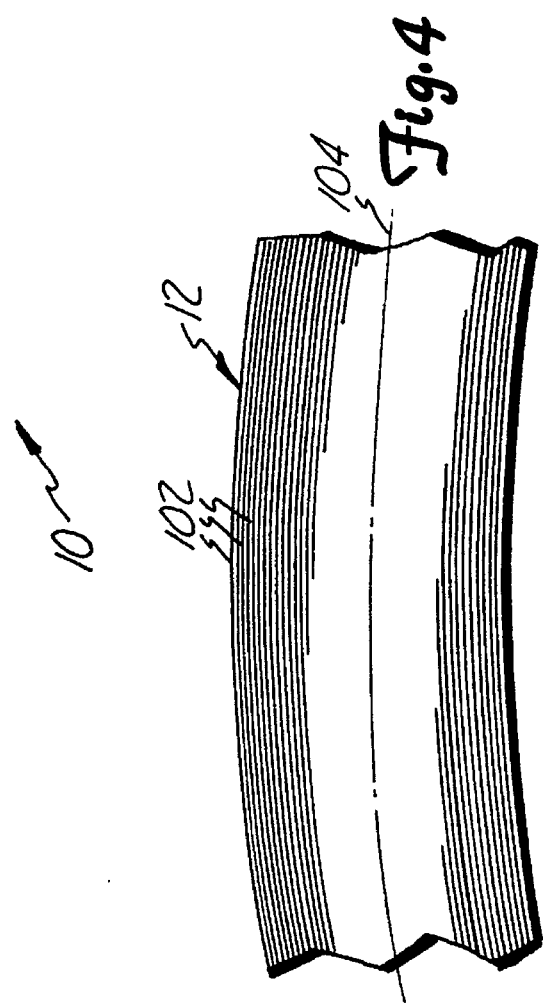

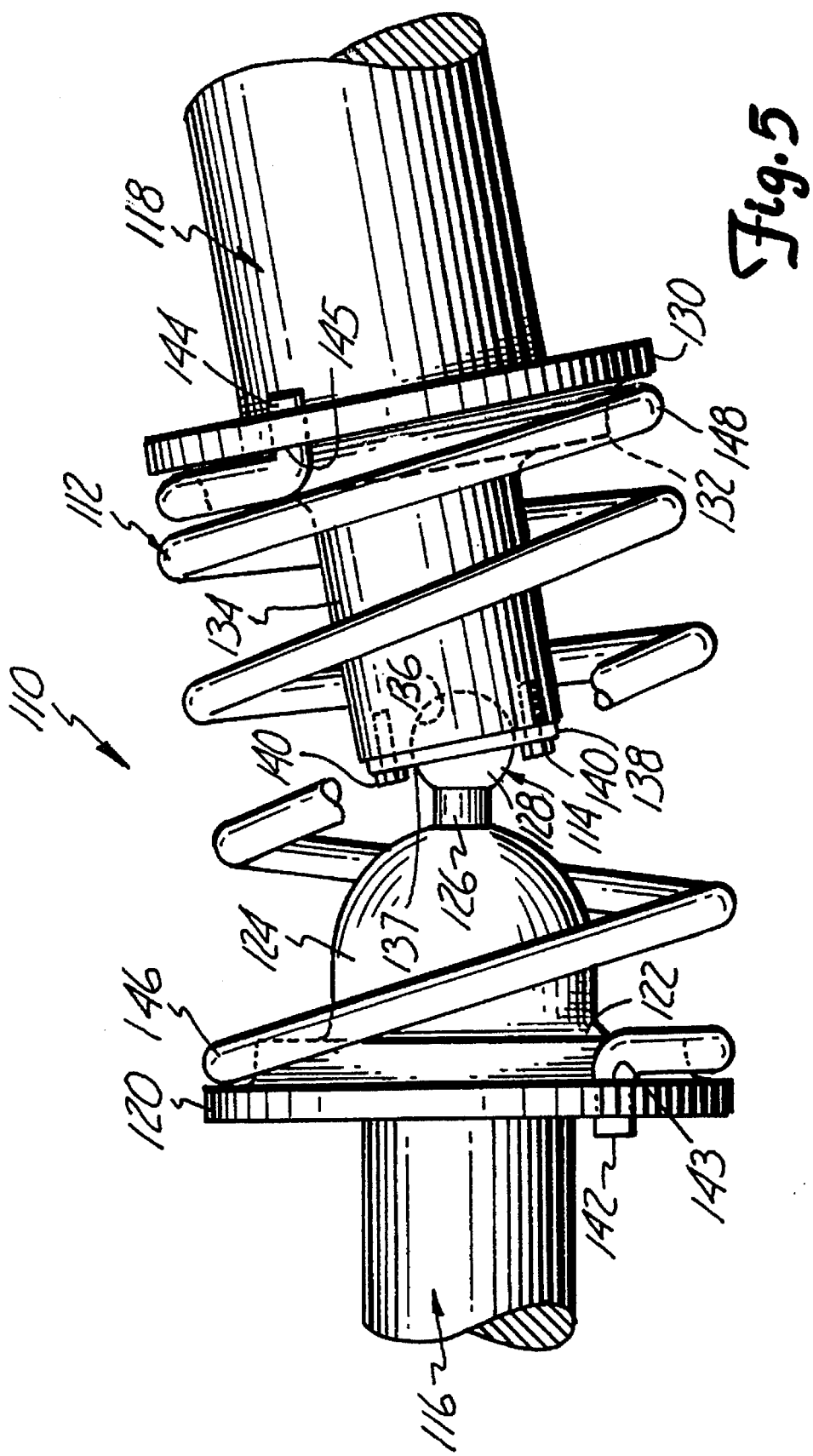

UNIVERSAL COUPLING

BACKGROUND OF THE INVENTION

The present invention relates to flexible couplings, and in particular, it relates to flexible couplings for connecting drive shafts.

Drive shafts that are used in variable velocity situations have problems that differ greatly from a constant velocity situation. One problem of great importance in a variable velocity situation is shock loads which are delivered both to the drive shaft and to the component being run by the drive shaft. Such shock loads are detrimental to the drive shaft, and especially to the component that is being run by the drive shaft, such as a pump.

The equipment is also subject to abuse from harmonic resonance. All rotating equipment has one or more natural torsional frequencies. When the system's speed corresponds to one of these natural frequencies, resonance occurs. At these resonant speeds, the amplitude of system vibrations is greatly magnified. The resonance can quickly destroy bearings, mounts and other connected equipment, including the drive shaft. Next to catastrophic overloads, operating in a resonance condition is probably the fastest way to destroy rotating equipment.

The problem of shock loads is further compounded when the drive shaft includes a coupling. Such couplings are needed, for example, to perform maintenance on either the component that is being run, such as the pump, or on the motor that is used to run the pump. Oftentimes, the drive shaft is joined together by a shear pin. However, this type of an arrangement is not suitable where shock loads occur frequently since the shear pin will have to be replaced frequently. In addition, such a shear pin connection does not provide for easy re-connection of the two drive shafts, especially when either the motor or the component that is being run has been removed for maintenance.

Another arrangement that is commonly used to connect two drive shafts are conventional universal joints. Examples of such joints are illustrated on pages 16 and 17 of the *Pictorial Handbook of Technical Devices* by P. Grafstein et al, Chemical Publishing Co., New York, 1971. However, for the most part, these types of universal joints directly transmit shock loads and may themselves be harmed or fatigued over time because of such shock loads.

Another type of coupling is described in U.S. Pat. No. 1,485,036 granted to Kingsley. The Kingsley patent describes a universal joint that connects two shafts. The joint includes a coil spring engaging threaded end portions of two shafts and is disposed about a ball and socket arrangement that also connects the two shafts. Rotative movement between the shafts is transmitted through the coil of the spring. Although the arrangement described in the Kingsley patent absorbs shock loads better than conventional constant velocity U-joints, the coil spring described in the Kingsley patent simply transmits rotational movement and does not provide for dampening shock loads. For example, the Kingsley patent states that "driving torque will be transmitted through the spring with the maximum efficiency and without distortion of any of the parts≈.

SUMMARY OF THE INVENTION

The present invention includes a joint for connecting a first drive shaft with a second drive shaft, the joint comprising a ball and socket arrangement connecting the first and second drive shafts and a spring connected at one end to one drive shaft and at the other end to the other drive shaft. The spring is made of a polymer matrix containing fibers made from poly(p-phenylene terephthalamide) resin. The fibers extend through the helical axis of the spring. The spring is disposed about the ball and socket arrangement and absorbs shock loads that would otherwise be transmitted from one shaft to the other.

BRIEF DESCRIPTION OF THE DRAWINGS

FIG. 1 is an elevational view of the preferred embodiment of the joint of the present invention.

FIG. 2 is an exploded perspective view of the joint showed in FIG. 1.

FIG. 3 is a cross-sectional view taken along line 3—3 of FIG. 1.

FIG. 4 is a cross-sectional view taken along with line 4—4 of FIG. 1.

FIG. 5 is an elevational view of a second embodiment of the present invention.

DETAILED DESCRIPTION OF THE PREFERRED EMBODIMENTS

The joint, which is flexible as shown in FIGS. 1 and 5, has several distinct advantages. The present invention is particularly suitable for connecting two drive shafts undergoing variable torsional velocity including frequent starts and stops. The joint dampens shock loads due to the variable velocity while transmitting angular motion from one shaft to the next. The joint additionally permits nonaxial connection of the two shafts.

Referring to FIGS. 1 and 2, the joint of the present invention is generally indicated at 10. The joint includes a spring 12 and a ball arrangement 14 connecting a first end portion 16 to a second end portion 18. The ball arrangement 14, first end portion 16 and second end portion 18 are constructed of aluminum, steel or other high strength material.

The first end portion 16 includes a cuff 20 which is preferably integral with a cylindrical projection 22. The first end portion 16 defines an central aperture 24 that extends through the end plate and the cylindrical projection 22. The central aperture 24 includes a wide portion 26, which abuts a narrow portion 28, which in turn abuts a socket 30. A grease valve 32 threadably engages the cylindrical portion 22 adjacent a juncture 34 between the wide portion 26 and the narrow portion 28 of the central aperture 24.

In operation, a nozzle of a grease gun (not shown) is inserted into the wide portion 26 of the central aperture 26 and is connected to the grease valve 32. Grease, squeezed from the grease gun, flows through the grease valve 32, then through the narrow portion 28 of the central aperture 26, and into the socket 30. The grease reduces friction in the ball arrangement 14.

The cuff 20 includes a circumferential wall 36 and an end wall 38. The circumferential wall 36, the end wall 38 and the cylindrical projection 22 cooperatively define a spring groove 40. A plurality of bores 42 are circumferentially disposed in the wall 36. The bores 42 are sized and threaded to properly receive screws 44 for securing a first end 45 of the spring 12 within the spring groove 40.

The ball arrangement 14 includes a threaded post 46, a ball 48, a ring 50, a clamp 52, a plate 54 and screws 56. A channel 58 disposed within the ball 48 is sized and positioned to receive the post 46. The post 46 has a flange 60 whose diameter is greater than the diameter of the channel 58. The flange 60 is integral with a first end 62 of the post 46. Thus, the flange 60 prevents the post 46 from passing completely through the ball 48. The clamp 52 fits on the side of the ball 48 opposite the flange 60 and into a groove 64 defined in the post 46. The clamp 52 substantially limits movement of the ball 48 in relation to the post 46, other than rotational movement of the ball 48 around the post 46.

The ring 50 fits around the ball 48 such that there is a generally uniform gap between the ring 50 and the ball 48. Typically, the ring 50 has inner diameters at both ends 66,68 that are smaller the diameter of the ball 48. This prevents removal of the ring 50 from the ball 48. The ring 50 has an external diameter of a size such that the ring is positionable in the socket 30. The ring 50 is supported against a shoulder 70 located adjacent the socket 30.

The plate 54 fits snugly against the cylindrical projection 22 to firmly grip the ring 50 between the plate 54 and the shoulder 70. A seal may be placed between the plate 54 and the cylindrical projection 22 to help maintain grease around the ball 48. Such seals are known in the art of ball and socket joints. A central aperture 72 is defined in the plate 54. The aperture 72 is sized such the that ball 48 extends into the aperture 72 without touching the plate 54. A plurality of holes 74 are positioned in the plate 54 and a plurality of threaded holes 75 are disposed in the projection 22. The holes 74 are alignable with the holes 75. Screws 56 extend into the holes 74 to threadably engage the holes 75. The screws 56 hold the plate 54 securely against the ring 50 and the cylindrical projection 22.

The second end portion 18 includes a cuff 76, a frusto-conical projection 78, a nut 80 and screws 82. The cuff 76 and the projection 78 preferably are integral with each other. A central aperture 84 extends through the cuff 76 and the projection 78. The central aperture has a threaded narrow portion 86 and a wide portion 88. The narrow portion 86 threadably engages the post 46 and is sized small enough that the nut 80 can not pass through the portion 86. The wide portion 88 is sized large enough that the nut 80 easily fits therein. During construction of the joint 10, the post 46 is guided through the narrow portion 86 of the central aperture 84. The nut 80 threadably engages the post 46 and is drawn down tight against the shoulder 90.

The cuff 76 includes a circumferential wall 92 that cooperates with the projection 78 to define a spring groove 96. The spring groove 96 is sized to receive the spring 12 snugly. The wall 92 includes a plurality of bores 94. The bores 94 are designed to threadably engage screws 82. The screws 82 secure a second end 95 of the spring 12 within the spring groove 96.

The spring 12 is a coil spring having a helical configuration with a plurality of coil portions. The spring 12 is disposed about the ball assembly 14 and extends between the first end portion 16 and the second end portion 18. As previously mentioned screws 44 and screws 82 secure the spring 12 to the first end portion 16 and second end portion 18 respectively.

The spring 12 is made of a polymer matrix with a plurality of aramid fibers 102 extending along the helical axis 104 of the coil, as illustrated in FIG 3. The fibers 102 extend continuously through the coil 12, as illustrated in FIG. 4. Preferably, the polymer matrix is an epoxy resin currently sold under the trademark Epolite 2315 by the Hexcel Corporation or a resin comparable thereto.

Preferably, the aramid used in forming the fibers 102 is poly(p-phenylene terephthalamide). One suitable source for poly(p-phenylene terephthalamide) is E. I. DuPont De Nemours & Company of Wilmington, Del., and is sold under the trademark KEVLARβ. Preferably, the fiber 102 is in the form of continuous filament that extends along the helical axis 104 of the spring 12. The spring 12 is formed by placing the fibers 102 under tension and molding the spring 12 under pressure.

The spring 12 of the present invention has sufficient stiffness for transmitting torsional motion from one drive shaft to another. The actual application of the joint 10 determines the stiffness requirements of the spring 12. The following factors impact the actual stiffness of the spring 12: the tension of the fibers in the molding process, the fiber to resin ratio, the amount of compression in the molding process, and the curing time and temperature.

In addition, the coil spring 12 of the present invention has sufficient resilience, providing a dampening effect to variability in torsional movement, especially starting from a dead stop, protecting both the drive shafts and the motor and the equipment being moved from shock loads.

The diameter of the spring 12 may change as rotational force is applied to the joint 10. The coils on the spring 12 tend towards engaging with each other as the diameter of the spring 12 approaches its shortest length. When the coils are flush with each other, the diameter can not shorten any further. At least one strap 103 may be attached to the spring 12 to prevent the diameter from becoming too small. The strap 103 may be attached to the internal or external wall of the spring 12. The strap 103 as shown in FIG. 2, is oriented such that it will prevent too much expansion of the diameter of the spring 12. The strap 103 is positioned such that as the diameter of the spring 12 expands the strap 103 becomes tighter. When the diameter reaches a predetermined length, the strap 103 precludes further expansion. The strap 103 can also be used to prevent the diameter of the spring 12 from getting too small.

Further, the spring 12 of the present invention provides an arrangement for attaching one drive shaft to another such that the drive shafts do not have to be precisely aligned to be connected due to flexibility of the spring 12 and the rotation of the ball arrangement 14 in the socket 30.

The joint 10 attaches to a first drive shaft 97 and a second drive shaft 98 via screws 44 and 82 respectively (See FIG. 1). A first receiving end 99 of the first drive shaft 97 is sized and shaped to snugly receive the first end portion 16. The screws 44 extend through apertures in the first receiving end 99 and into bores 42 in the first end portion 16. A plurality of apertures are disposed about a second receiving end 100 of the second drive shaft 98. Screws 82 extend through the apertures in the second receiving end 100 and into the second end portion 18. This attachment mechanism is designed for shafts that are hollow and have an inner diameter that is similar to the external diameter of the end portions 16,18.

Alternatively the drive shafts 97,98 can be attached to the joint 10 with a shaft end plate 105 as shown in FIG. 2. The shaft end plate 105 defines a plurality of bores that extend into the first end portion 16 and second end portion 18. Screws are received within the bores to join the shaft end plate 105 to the end portions 16,18. The shaft end plate 105 defines a shaft opening 106. The shaft opening 106 includes teeth 107 that help limit the rotational slip between the drive shaft 98 and the shaft end plate 105. A set screw 108 extends into the shaft opening 106 for firmly holding the drive shaft 98 in the shaft opening 106. This attachment mechanism is well suited for drive shafts that are solid (i.e. not hollow).

Referring to FIG. 5, a second embodiment of the joint of the present invention is generally indicated at 110. The joint includes a spring 112 and a ball and socket arrangement 114 connecting a first shaft 116 with a second shaft 118. Typically, the shafts 116 and 118 are used in a variable rotation situation. For example, the shaft 116 could be a drive shaft of a large horse power pump (not shown) used in pumping slurries and the shaft 118 is an output shaft from a motor (not shown) for driving the pump. The speed of such a pump is varied frequently or the pump is turned on and off frequently.

The shaft 116 includes a flange 120 having a diameter greater than the shaft 116 and an annular shoulder 122 extending from the flange 120. A hemispherical base portion 124 extends from the annular shoulder 122. A stem portion 126 is mounted on the hemispherical portion 124 and a ball 128 is mounted on to the stem portion 126.

Similarly, the shaft 118 has a flange 130 having a diameter greater than the shaft and an annular shoulder 132 extending therefrom. The shaft 118 also includes a cylindrical base portion 134 extending from the flange 130. The portion 134 has a socket 136 in which the ball 128 is disposed. A retaining plate 138 is held against the base 134 by screws 140 which threadably engage threaded apertures in the base portion 134 and retains the ball 128 within the socket 136. The plate 138 includes an aperture 137 through which the ball 128 extends; the aperture 132, however, is less in diameter than the ball 128, thereby retaining the ball 128 within the socket 136.

The spring 112 is a coil spring having a helical configuration with a plurality of coil portions. The spring 112 is disposed about the ball and socket assembly 114. The spring 112 further includes a first end portion 142 projecting substantially parallel to the axis of the drive shaft 116 and extending through an aperture 143 of the flange 120. The spring 112 also includes another end portion 144 projecting substantially parallel to the axis of the drive shaft 118 and projecting into an aperture 145 of the flange 130. The end portions 142 and 144 retain the spring in position. The spring further specifically includes coil end portions 146 and 148 disposed proximate the end portions 142 and 144 and which engage the annular shoulders 122 and 132, all respectively. The spring 112 has substantially the same physical characteristics and composition characteristics as the spring 12.

Although the present invention has been described with reference to preferred embodiments, workers skilled in the art will recognize that changes may be made in form and detail without departing from the spirit and scope of the invention.

What is claimed is:

1. A joint comprising:

a first drive shaft;

a second drive shaft;

a socket disposed within the first drive shaft;

a ball attached to the second drive shaft and disposed within the socket of the first drive shaft; and a spring having two ends, the spring being formed of a polymer matrix, the matrix formed to a force sufficiently flexible for permitting non-axial connection of the first and the second drive shafts, sufficiently resilient for absorbing and dampening torsional shock loads in a variable velocity system, sufficiently stiff for transmitting torsional motion from the first drive shaft to the second drive shaft, and sufficiently stiff for transferring rotational forces through the joint, the spring being attached at one end to the first shaft and at the other end to the second shaft and being deposed about the ball and socket.

2. The joint of claim 1 wherein the first shaft defines a first aperture and the second shaft defines a second aperture and wherein the spring has first and second ends extending into the apertures to hold the first and second ends of the springs with the first and second shafts, respectively.

3. The joint of claim 2 and further including a first flange attached to the first shaft and having a diameter greater than the shaft and a second flange attached to the second shaft and having a diameter greater than the second shaft and wherein the first and second shafts define the first and second apertures.

4. The joint of claim 3 wherein the first shaft has a first annular shoulder for engaging a first coil portion of the spring disposed on the first flange and the second shaft has a second annular shoulder extending from the second flange for engaging a second coil portion of the spring.

5. The joint of claim 1 wherein a retaining plate retains the ball within the socket and is fixedly attached to the first drive shaft.

6. The joint of claim 1 wherein the aramid fibers are made of poly(p-phenylene terephthalamide) resin.

7. The joint of claim 6 wherein the polymer matrix is an epoxy resin.

8. The joint of claim 1 wherein the first drive shaft includes a first end portion.

9. The joint of claim 8 wherein the second drive shaft includes a second end portion.

10. The joint of claim 9 wherein the first end portion and the second end portion define first and second spring grooves sized to receive a first end of the spring and a second end of the spring.

11. A joint comprising:

a first end portion comprising a first cuff and a first projection, the first end portion defining a first spring groove and the first end portion defining a first plane;

a second end portion comprising a second cuff and a second projection, the second end portion defining a second spring groove, and the second end portion defining a second plane;

a spring having a central core around which the spring rotates, the spring being formed of a polymer matrix to a force sufficiently flexible for permitting substantially non-axial connection of drive shafts, sufficiently resilient for transferring torsional movement from a drive shaft to a second drive shaft, and sufficiently stiff for transferring rotational forces when the first plane and the second plane are parallel planes and when the first plane and the second plane are intersecting planes, the spring having a first end received within the first spring groove, the spring having a second end received within the second spring groove.

12. The joint of claim 11 further comprising:

a socket defined by the first end portion; and a ball arrangement attached to the second end portion, the ball arrangement being partially received within the socket.

13. The joint of claim 12 wherein the ball arrangement further comprises:

a ball defining a channel;

a post, the post being inserted into the channel in the ball; and a clamp, the clamp holding the ball on the post.

14. The joint of claim 13 wherein the ball is rotatably mounted around the post.

15. The joint of claim 12 wherein the first end portion further comprises:

grease valve means for inserting grease into the socket.

16. The joint of claim 11 wherein the first end portion is integral with the first shaft.

17. The joint of claim 16 wherein the second end portion is integral with the second shaft.

18. A joint comprising:

a first end portion, the first end portion defining a first spring groove and the first end portion defining a socket;

a second end portion, the second end portion defining a second spring groove;

a ball arrangement attached to the second end portion, the ball arrangement being partially received within the socket; and a spring having a diameter that changes as rotational force is applied to the spring, the spring being formed of a polymer matrix to a force sufficiently stiff for transferring rotational forces from a first drive shaft to a second drive shaft, sufficiently resilient for absorbing and dampening torsional shock loads, and sufficiently stiff for transmitting torsional movement, the spring having a first end received within the first spring groove, the spring having a second end received within the second spring groove.

19. The joint of claim 18 further comprising:

a first shaft, the first shaft being attached to the first end portion.

20. The joint of claim 19 wherein the first shaft is integral with the first shaft.

* * * * *